Feb. 17, 1970  B. ASH ET AL  3,495,302
MACHINES FOR INJECTING PLASTICS MATERIAL INTO A MOUND
Filed March 22, 1965  2 Sheets-Sheet 1

INVENTOR
BERNARD ASH
GEOFFREY HUGH CROFTON GREEN
BY
Hall & Houghton
ATTORNEYS

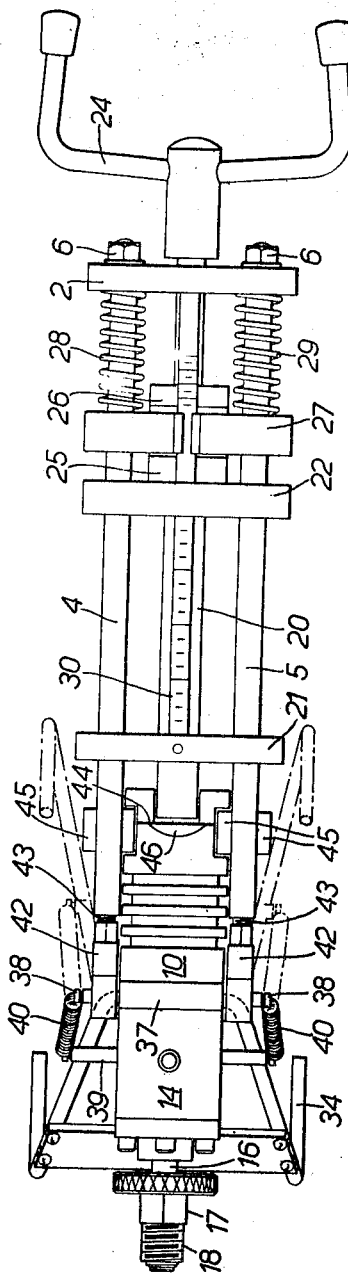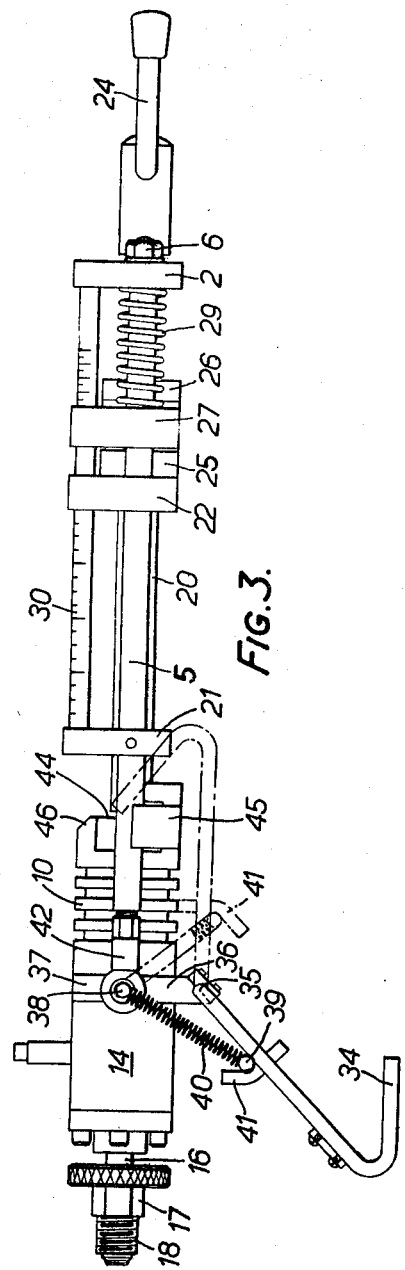

United States Patent Office 3,495,302
Patented Feb. 17, 1970

3,495,302
MACHINES FOR INJECTING PLASTICS MATERIAL INTO A MOUND
Bernard Ash, Watford, and Geoffrey Hugh Crofton Green, Ruislip, England, assignors to Her Majesty's Postmaster General, London, England
Filed Mar. 22, 1965, Ser. No. 441,795
Claims priority, application Great Britain, Mar. 26, 1964, 12,931/64
Int. Cl. B29f 1/06
U.S. Cl. 18—30    7 Claims

ABSTRACT OF THE DISCLOSURE

Compact apparatus for injecting plastics material into a mould in which a piston drives the material through a barrel, an extension to the barrel only is heated, the piston is moved by a screw device and the pressure is applied and maintained by two springs. The piston, screw device and springs are mounted on guide rods and the piston can be withdrawn from the barrel and swung away to recharge the latter during the injection process without ill effect on the moulding. Indications can be obtained of the pressure applied to the charge and the extent of movement of the piston into the barrel.

---

This invention relates to machines for injecting plastics material into a mould in which the material is formed into a desired shape. The machine is intended particularly for use in the jointing of electric cables with sheaths and/or dielectric cores of a plastics material, for example of polythene. However, the machine can also be used with suitable moulds for the production of articles of plastics materials.

BACKGROUND OF THE INVENTION

In the jointing of cables having a dielectric core and/or sheath of polythene, it has been the practice to use injection moulding techniques to complete the polythene layers, i.e. sheath and/or dielectric core, the cable being placed in a suitable mould heated to soften the polythene, extra polythene being injected to fill the mould and fuse with the polythene core or sheath already present. Injection moulding is also used for making the cable-entry glands for repeaters.

Polythene is fed to the mould by means of an injecting machine having an injection barrel in which the extra polythene is housed, softened and then injected into the mould under pressure.

Many electric cables have to be jointed on site and in many cases access to the cable is difficult and working space limited. In most machines hitherto used, the injection pressure has been derived hydraulically which has necessitated somewhat bulky equipment including an injection barrel of a size adequate to contain the amount of polythene required to fill the mould because release of pressure to refill the barrel might produce flaws in the joint. Attempts have been made to reduce the size of the machines for use in confined spaces with limited success only.

It has been proposed to derive injection pressure by means of a compressed spring and this has resulted in some reduction in size of the machine. It has, however, not been possible to effect any substantial reduction because of the need for an injection barrel of sufficient capacity to fill moulds of various sizes and a large barrel requires correspondingly bulky associated components, for example, heating equipment.

SUMMARY OF THE INVENTION

According to the present invention apparatus for injecting a plastics material into a mould comprises an unheated injection barrel for containing a charge of plastics material, an extension to the barrel forming a discharge passage therefrom, means for heating the extension only, and a mechanism for forcing the charge from the barrel through the extension, the mechanism permitting continual replenishment of the barrel during the injection process.

In one embodiment of the invention, the mechanism comprises a piston and a manually-operable screw device for advancing the piston into the barrel and withdrawing the piston from the barrel. The device includes a resilient coupling through which pressure is applied to the piston and which receives the reaction pressure on the piston. The mechanism is preferably of a form such that the piston can be withdrawn completely from the barrel to permit the replenishment of the latter. The piston and screw device may be slidably mounted upon guide rods one of which may form a pivotal mounting for the piston and screw device and enables the latter components to be swung clear of the barrel to facilitate replenishment.

Alternatively, the piston and screw device may be slidably mounted upon guide rods which are pivotally connected to the barrel so that the guide rods and the piston and screw device they carry can be swung clear of the barrel to facilitate replenishment of the charge therein.

Preferably, the mechanism is fitted with a pressure responsive device for indicating the pressure applied to a charge in the barrel and with an indicator for revealing the extent of movement of the piston into the barrel, thus providing an indication of the need for replenishment.

BRIEF DESCRIPTION OF THE DRAWINGS

Embodiments of the invention suitable for use in the jointing of polythene-sheathed, coaxial electric cables with a polythene dielectric will now be described in greater detail with reference to the accompanying drawings of which:

FIGS. 2 and 3 are respectively a plan view and side elevation of a second embodiment.

DESCRIPTION OF THE PREFERRED EMBODIMENTS

Figure 1:
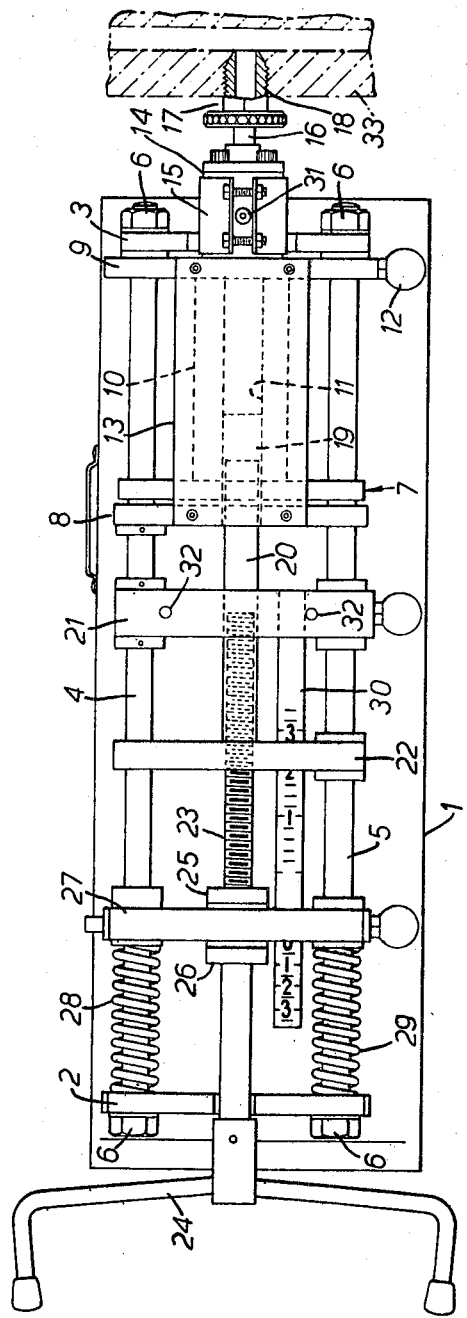
FIG. 1 is a simplified plan view of a first embodiment.

The embodiment shown in FIG. 1 has a rectangular base 1 to which end plates 2 and 3 are secured adjacent the shorter sides of the base. Mounted between the end plates 2, 3 and spaced above the base 1 are guide rods 4, 5. The rods are secured in position by nuts 6 and are also supported between their ends by an intermediate support plate 7 fixed to the base 1. Mounted upon the guide rods 4, 5 are carriers 8, 9 of generally rectangular form which support between them an injection barrel 10. The carriers 8, 9 each have an aperture at one end through which the guide rod 4 passes whilst at the other end each carrier is of hook-like form, the hook resting on the other guide rod 5. The injection barrel is a cylindrical vessel with an axial bore 11 and end flanges (not shown) by means of which the barrel is held to the carriers 8, 9. The assembly comprising the carriers 8, 9 and the injection barrel mounted between them can thus be pivoted about the guide rod 4 and a handle 12 is fixed to the carrier 9 to enable a user to pivot that assembly when required. The barrel is concealed beneath a cover plate 13 secured between the carriers 8 and 9.

Secured to one end (the right-hand end as seen in FIG. 1) of the injection barrel 10 is one end of a barrel extension piece 14 having a bore of the same internal diameter as, and aligned with, the bore 11 of the barrel 10. Secured around the extension piece 14 is a jacket 15 containing a heating coil connected by a flexible lead (not shown) to a socket in the base 1. In this embodiment, the extension piece 14 is made of brass and the injection barrel 10 of stainless steel. The comparatively low thermal conductivity of stainless steel combined with the relatively large mass of the barrel make for only a slight rise in temperature of the barrel during any one injection process.

Bolted to the outer end of the extension piece 14 is an injection nozzle 16 carrying a manually rotatable locking collar 17 screw-threaded at 18 and by means of which a mould is secured to the nozzle. The mould is described later.

Slidable in the bore 11 of the barrel 10 is a piston head 19 screwed to a ram 20 slidably mounted in a central aperture in a bearing block 21 whose form is generally similar to that of the carriers 8 and 9 and which is also carried by the guide rods 4, 5 and can be swung about rod 4. The ram 20 is fixed at the end remote from the piston head 19 to a thrust plate 22 and is in screw-threaded engagement with a pressure screw 23 which passes through the thrust plate 22 and extends to the left as seen in FIG. 1. The thrust plate 22 is slidable along the guide rods 4, 5. To the outer end of the pressure screw 23 is secured a handle 24. Midway of its ends, the pressure screw is formed with a bearing disc 25 and adjacent the latter the screw carries a bearing collar 26 which is fixed to the screw. Between the disc 25 and the collar 26 is located a pressure plate 27 whose form is also generally similar to that of the carriers 8, 9.

Mounted between the end plate 2 and the pressure plate 27 are helical springs 28, 29 which encircle those portions of the guide rods lying between the plates 2 and 27 respectively.

Joined to the bearing block 21 and extending towards the end plate 2 is a graduated rod 30 which passes through apertures in the thrust plate 22 and the pressure plate 27. The position of the thrust plate 22 against the scale on that side of the pressure plate 27 indicates the position of the piston head 19 in the bore of the barrel 10. An arbitrary scale on the end plate 2 side of the pressure plate 27 is used to give a measure of the pressure applied by both springs to the ram assembly. The pressure is dependent on the size and type of springs employed, but the scale can be calibrated for any given conditions.

Extension piece 14 has an aperture 31 which is adapted to receive a temperature indicator not shown in FIG. 1. Further, the bearing block 21 has screw-threaded recesses 32 for the reception of temperature indicators when the machine is not in use.

Mounted upon the base 1 but not shown in FIG. 1 are controls for the heating coil in the jacket 15 which enable the temperature of the extension piece to be set to and maintained at a selected value. The base may also contain controls for regulating the temperature of the mould with which the apparatus is used.

To use the embodiment shown in FIG. 1 to complete a joint between two coaxial cables with polythene dielectrics and sheaths, the metallic inner conductors of the cables are joined together and the joint is placed in a mould part of which is indicated at 33 and the mould is screwed on to the nozzle 16 by means of the locking collar 17. The mould is electrically heated and the heating circuit is connected by flexible leads to the controls mounted in the base 1 and to a mains supply or a mobile power source. The electric heaters are then energized to bring the mould and the extension piece 14 up to temperature. To charge the injection barrel, the handle 24 is rotated to withdraw the piston head 19 clear of the bore 11 after which the assembly comprising the ram 20, bearing block 21, thrust plate 22, pressure screw 23, handle 24 and the pressure plate 27 is swung about the guide rod 4 to a position in which the piston assembly is approximately vertically above guide rod 4 and in which the piston head 19 is clear of the entrance to bore 11. A charge of polythene is then inserted and the assembly just mentioned returned to its original position.

The handle 24 is now rotated in the opposite direction thereby advancing the piston head 19 towards, into and along the bore 11. At this stage there is little resistance to the movement of the piston and the springs 28 and 29 are not compressed to any appreciable extent. As the piston head 19 commences to force the polyethene through the nozzle 16, resistance to the piston head movement increases and compression of the springs 28 and 29 commences. As the resistance to the piston head movement changes, the compression of the springs 28 and 29 increases or decreases and the piston head 19 is advanced smoothly and evenly into the bore 11. The pressure developed in the material in the bore depends on the compression imparted to the springs and on the transverse cross-sectional area of the piston head. A measure of the pressure is obtained from the position of the pressure plate 27 along the graduated rod 30.

The scale rod 30 also reveals the extent of movement of the piston head 19 into the bore 11 and when the movement is such that it is almost equal to the length of a charge, the piston head is withdrawn and the assembly swung about the guide rod 4 in the manner described above and a fresh charge is inserted into the bore. The process is repeated until the mould is full. When the mould is full, sufficient polyethylene is put into the bore 11 to accommodate contraction on cooling of the polythene in the mould, and the handle 24 is rotated to load the springs 28 and 29 by an amount sufficient to prevent the formation of voids in the contracting polythene as the system cools.

Since only the extension piece 14 is heated, so that a charge inserted into the bore 11 retains its shape until it enters the piece 14 and is under minimal pressure until the mould is full, the filling of the mould can be considered as effectively continuous. As explained above, the rise in temperature of the barrel is only slight. Further, the wtihdrawal of the piston head from contact with solid polythene in the barrel does not draw back material from the mould and thus create voids, as might happen with a softened charge, particularly if some pressure has been applied.

When the joint is cold, the mould is separated from the equipment and the joint removed from the mould. The metallic outer conductors of the cables are then joined and the process described above is repeated to complete the cable sheaths over the joint.

In the case of non-coaxial cables having a polythene sheath, the metallic conductors are joned after which the sheaths are completed using the technique just described.

The method described of applying pressure has the advantage that it requires only intermittent attention to maintain adequate pressure on the charge because of the slow release of energy stored in the springs 28 and 29.

The second embodiment shown in FIGS. 2 and 3 is generally similar to that described above with reference to FIG. 1 and corresponding parts in both embodiments have been given the same reference numbers. FIGS. 2 and 3 do not show the heating jacket of the extension piece 14 but this takes the same form as jacket 15 described above. The heating coil in the jacket is joined to terminals in a connection box (not shown) mounted on the jacket. The connection box is adapted to receive the connector of a flexible lead by which connection is made to a power source.

In the second embodiment, there is no base corresponding to base 1 described above but instead, curved support legs 34 are pivotally mounted at 35 to a bracket 36 forming part of a collar 37 mounted between the barrel 10 and the barrel extension piece 14. The collar 37 also mounts opposed diametrically extending stub axles 38 and between these and the ends of a cross member 39 fixed between the legs 34 as shown are helical springs 40. The relative positions of the pivot ponts 35 and the axles 38 impart an over centre action to the springs 40 and these hold the legs 34 either in the position shown in full lines or in that shown in dotted lines. Both positions are defined by a curved rod 41 fixed to the cross member 39. In the full-line position of legs 34, one end of rod 41 abuts the surface of the connection box referred to above while the other end of the rod abuts the surface of the barrel 10 in the dotted-line position of the legs.

Pivotally mounted on the stub axles 38 are members 42 into which screw the threaded ends 43 of the rods 4, 5. The members 42 thus replace the end plate 3 of the first embodiment. The rods 4, 5 are closer together than in the first embodiment and they carry the end plate 2, the pressure plate 27, the thrust plate 22 and the bearing block 21.

The bearing block 21 and the plates 2, 22 and 27 are mounted on both rods 4, 5 and are of triangular shape when seen in front elevation and this form allows the graduated scale rod 30 to be mounted centrally above rods 4 and 5.

The open end of the bore of barrel 10 is stepped as at 44 and is fitted with a semi-circular support collar 45 whose recessed ends receive the rods 4, 5 as will be explained later. The open end is also chamfered as at 46 to provide clearance for the piston head when the latter is swung clear for re-charging. The collar 45 supports the rods 4, 5 while the recessed ends limit lateral movement of the rods. The result is rapid and accurate alignment of the piston with the barrel.

From what has been said it will be appreciated that the assembly comprising the rods 4, 5, end plate 2, block 21, plates 22, 27, and ram 20 can be pivoted about the stub axles 38 from the position shown in FIGS. 2 and 3 to one in which the assembly extends almost vertically upwards from the barrel 10.

It is intended that the second embodiment be mounted upon a supporting surface fitted with tubes for receiving the ends of the legs 34. However, if necessary the legs could be rested on any other suitable surface. A further support will usually be required under the collar 45 to give stability. The embodiment does not have to be used in a horizontal position and by using different sized supports beneath collar 45 the angle of working can be varied.

To use the embodiment shown in FIGS. 2 and 3 the joint is placed in a mould whose injection orifice is screwed on to the nozzle 16. The barrel is fully charged with polythene and the mould is connected to a convenient power source. When the mould and the extension piece 14 have reached a requisite working temperature, handle 24 is now rotated to advance the piston head into the bore of the barrel and moulding proceeds in the manner described above with reference to the first embodiment.

If the barrel requires to be re-charged, the piston head is withdrawn clear of the bore and the assembly mentioned above is swung to the vertical position. A charge of polythene is inserted into the bore of the barrel and the assembly is then returned to its original position, and the injection procedure continued.

Again, the embodiment can be used not only to complete a polythene sheath over a cable joint can also, as in the case of a coaxial cable with dielectric of a plastics material, be used to complete the dielectric.

It will be appreciated that both embodiments may be used with a suitably designed mould to produce plastics articles.

We claim:

1. Apparatus for injecting a plastics material into a mould comprising, in combination, an unheated injection barrel for containing a charge of plastics material, the mould having a capacity greater than the capacity of said barrel, an extension to the barrel forming a discharge passage therefrom, said means comprising a heating system positioned on the extension for heating the latter only, a piston head reciprocable within the barrel for forcing plastics material contained therein from the barrel into and through the extension, and a mechanism for reciprocating the piston head in the barrel into and out of contact with the plastics material therein and for withdrawing the piston head from the barrel, said mechanism comprising, in combination, a manually operated screw device connected to the piston head, guide members, a pressure plate supporting the screw device and movable along the guide members, an end plate fixed to the guide members and resilient means disposed between the pressure plate and the end plate for compression on movement of the pressure plate toward the end plate, said pressure plate being pivotally mounted upon one of said guide members for swinging movement about the axis thereof.

2. Apparatus as claimed in claim 1 in which said guide members comprise parallel rods and further comprising a thrust plate secured to said piston head, said thrust plate being slidable along said rods and pivotally mounted upon that one thereof upon which said pressure plate is pivotally mounted.

3. Apparatus for injecting a plastics material into a mould comprising, in combination, an unheated injection barrel for containing a charge of plastics material, the mould having a capacity greater than the capacity of said barrel, an extension to the barrel forming a discharge passage therefrom, said means comprising a heating system positioned on the extension for heating the latter only, a piston head reciprocable within the barrel for forcing plastics material contained therein from the barrel into and through the extension, and a mechanism for reciprocating the piston head in the barrel into and out of contact with the plastics material therein and for withdrawing the piston head from the barrel, said mechanism comprising, in combination, a manually operated screw device connected to the piston head, guide members, a pivotal connection between said guide members and said injection barrel, a pressure plate supporting the screw device and movable along the guide members, an end plate fixed to the guide members and resilient means disposed between the pressure plate and the end plate for compression on movement of the pressure plate toward the end plate.

4. Apparatus as claimed in claim 3 in which said guide members comprise parallel rods and further comprising a thrust plate secured to said piston head, said thrust plate being slidable along said rods.

5. Apparatus as claimed in claim 3 and further comprising movement indicating means for revealing both the position of the piston in the barrel and the pressure applied to a charge of plastics material therein.

6. Apparatus as claimed in claim 3 in which said mechanism is pivotally mounted upon said barrel to provide access thereto for the purpose of replenishing said charge of plastics material.

7. Apparatus as claimed in claim 6 in which said mechanism further comprises a resilient coupling adapted to receive and store reaction pressure experienced by the piston head during injection and to apply the stored pressure to the piston in the event that the reaction pressure is less than the stored pressure.

References Cited

UNITED STATES PATENTS

| | | | |
|---|---|---|---|
| 1,810,126 | 6/1931 | Buchholz | 264—328 |
| 2,110,570 | 3/1938 | Eichengrun | 18—30 |
| 2,296,295 | 9/1942 | Shaw | 264—329 |
| 2,296,296 | 9/1942 | Shaw | 18—30 |
| 2,337,550 | 12/1943 | Crosby | 18—30 |
| 2,569,919 | 10/1951 | Bertrand et al. | 18—30 |
| 2,620,512 | 12/1952 | Larson | 18—5 |
| 3,009,197 | 11/1961 | Hahn | 18—30 |

WILBUR L. McBAY, Primary Examiner

U.S. Cl. X.R.

18—3.5, 12; 264—329